United States Patent [19]

Savard et al.

[11] Patent Number: 5,014,808
[45] Date of Patent: May 14, 1991

[54] TWO WHEELED VEHICLE HAVING AN ADJUSTABLE CASTOR AND CASTOR ANGLE

[76] Inventors: Frank J. Savard; Patrick A. Savard, both of 2 Rue de Launay, F-22360 Langueux, France

[21] Appl. No.: 275,171
[22] PCT Filed: Feb. 9, 1988
[86] PCT No.: PCT/FR88/00073
§ 371 Date: Oct. 7, 1988
§ 102(e) Date: Oct. 7, 1988
[87] PCT Pub. No.: WO88/05743
PCT Pub. Date: Aug. 11, 1988

[30] Foreign Application Priority Data
Feb. 9, 1987 [FR] France ............................. 87 01675
Mar. 4, 1987 [FR] France ............................. 8703018
Nov. 12, 1987 [FR] France ............................. 87 15818

[51] Int. Cl.⁵ ..................... B62K 25/24; B60B 1/00; B62M 17/00
[52] U.S. Cl. .................... 180/219; 180/224; 280/279
[58] Field of Search ............ 180/219, 224, 223, 226, 180/228; 280/276, 277, 279

[56] References Cited

FOREIGN PATENT DOCUMENTS

| | | |
|---|---|---|
| 0168273 | 1/1986 | European Pat. Off. . |
| 2340050 | 2/1975 | Fed. Rep. of Germany . |
| 2533523 | 3/1984 | France ............................. 280/279 |
| 2579950 | 10/1986 | France ............................. 180/224 |
| 2121364 | 12/1983 | United Kingdom . |
| 8809739 | 12/1988 | World Int. Prop. O. .......... 180/224 |

*Primary Examiner*—Michell J. Hill
*Attorney, Agent, or Firm*—Wenderoth, Lind & Ponack

[57] ABSTRACT

A vehicle comprises at least two wheels, a front wheel and a rear wheel. A driving motor is connected as a unit to a framework, the framework being made up of a number of tubular members forming two trapezium structures. The wheels are connected to the motor-framework unit by further members, as well as dampening devices. A transmission between the driving motor and both of the front and rear wheels is also provided. A steering assembly is connected to the front steering wheel and the framework. A strut, which may be part of the transmission, is adjustably connected between the motor-framework unit and the steering assembly. Furthermore, the vehicle can adjust the castor angle of the front wheel.

26 Claims, 5 Drawing Sheets

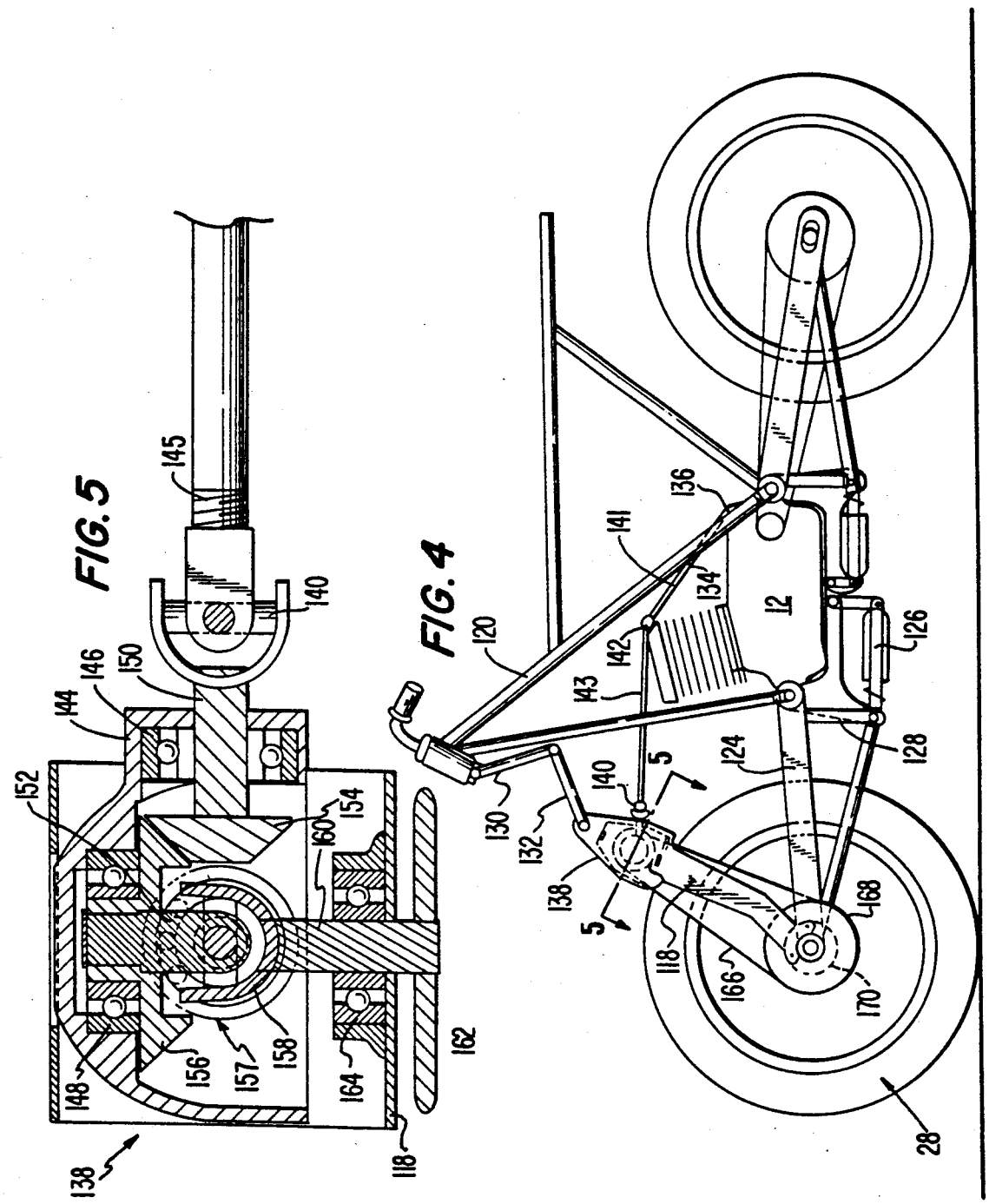

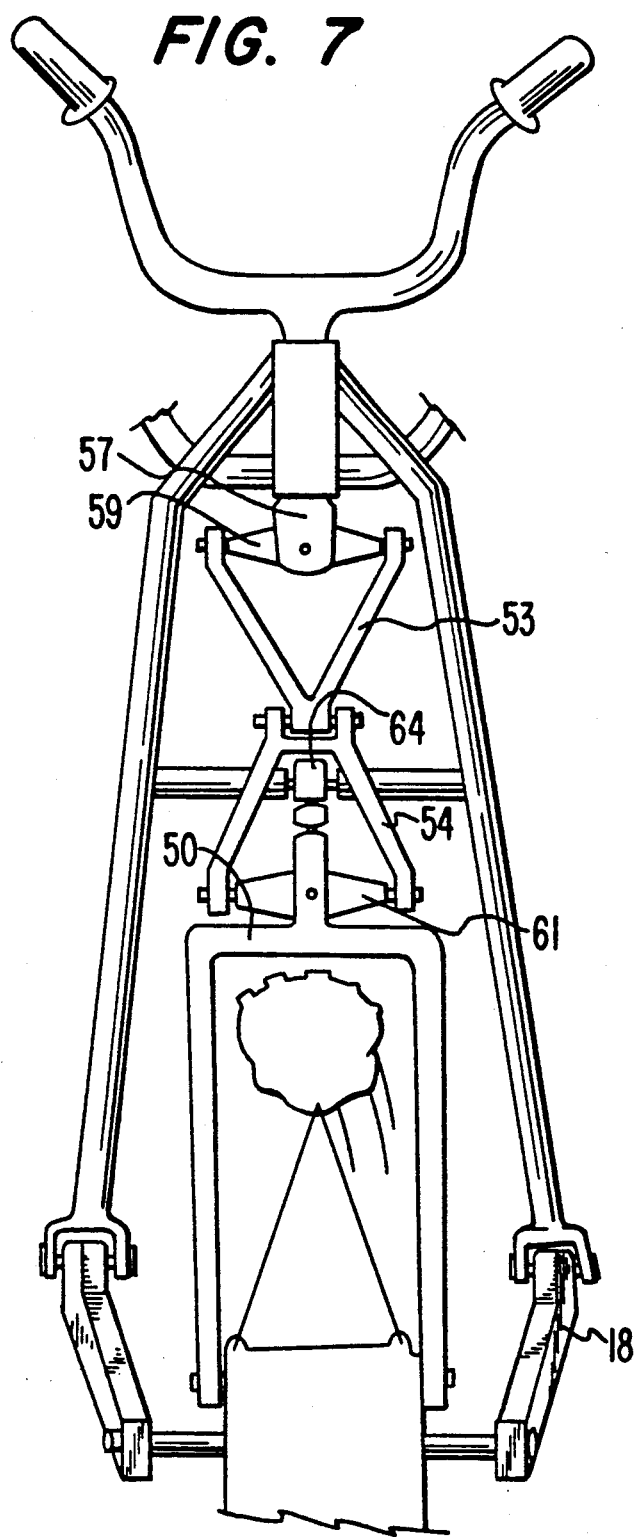

TWO WHEELED VEHICLE HAVING AN ADJUSTABLE CASTOR AND CASTOR ANGLE

BACKGROUND OF THE INVENTION

The present invention relates to a vehicle having front driving and steering wheels whose castor angle and castor are adjustable.

STATE OF THE PRIOR ART

Vehicles are already known which are, in particular, of the type having two wheels whose front and rear wheels are driving wheels. These motorcycles comprise a motor carrying a frame and two double pivotal arms supporting the front and rear wheels. Generally a damping device is disposed between the motor and each of the pivotal arms for damping the movements of each of the wheels relative to the frame and motor.

The solutions adopted as concerns the transmission to the wheels are based on the principle of a shaft provided with two universal joints, one being in direct engagement with the motor output shaft and the other driving the movable hub of the wheel. It has been found that this solution is not reliable over a period of time, since the universal joints undergo a large number of movements in different planes owing to the fact that, in particular, the front wheel, in addition to being driven in rotation, is a steering wheel, and moreover, it is necessary to add an intermediate shaft. It will, be moreover, understood that the fact of overdimensioning these various component parts has an adverse effect on the handling of the vehicle due to the increase in weight.

Another drawback of existing motorcycles results from the fact that the castor and the castor angle are initially defined for a given model and cannot be modified or adapted to other needs.

Lastly, it has been found that the driving of a motorcycle having two driving wheels is delicate, and it is advisable in certain cases to be in a position to disengage the drive from the front wheel, in particular when braking, since as the two wheels are driven through a common driving shaft, the locking of the rear wheel will cause the locking of the front wheel. A locking of the front wheel is very difficult to control and there are great risks of falls. Likewise, in certain special cases, on a surface of the asphalt type, it is preferable to reserve all of the power of the motor for the rear wheel and avoid losses of transmission to the front wheel, and it is here again advantageous to be able to uncouple the drive of the front wheel.

SUMMARY OF THE INVENTION

The present invention provides a vehicle which overcomes the drawbacks presented by the vehicles of the prior art while proposing devices adapted to solve the aforementioned problems, this vehicle comprising at least two wheels, a front wheel and a rear wheel, a driving motor, a damping mechanism, a braking mechanism and a steering control device, characterized in that it comprises a frame carrying a steering assembly and at least one transmission between the driving motor and the wheels.

BRIEF DESCRIPTION OF THE DRAWINGS

A better understanding of the invention will be had from the reading of the following detailed description of various embodiments according to the invention, with reference to the accompanying figures in which.

FIG. 4 is a side elevational view of a motorcycle comprising a transmission for driving the steering wheel according to the invention;

FIG. 5 is a sectional view taken on line 5—5 of FIG. 4;

FIG. 7 is a diagrammatic front elevational view of a variant of the steering arrangement shown in FIG. 1.

DETAILED DESCRIPTION OF THE PREFERRED EMBODIMENTS

Figure 1:
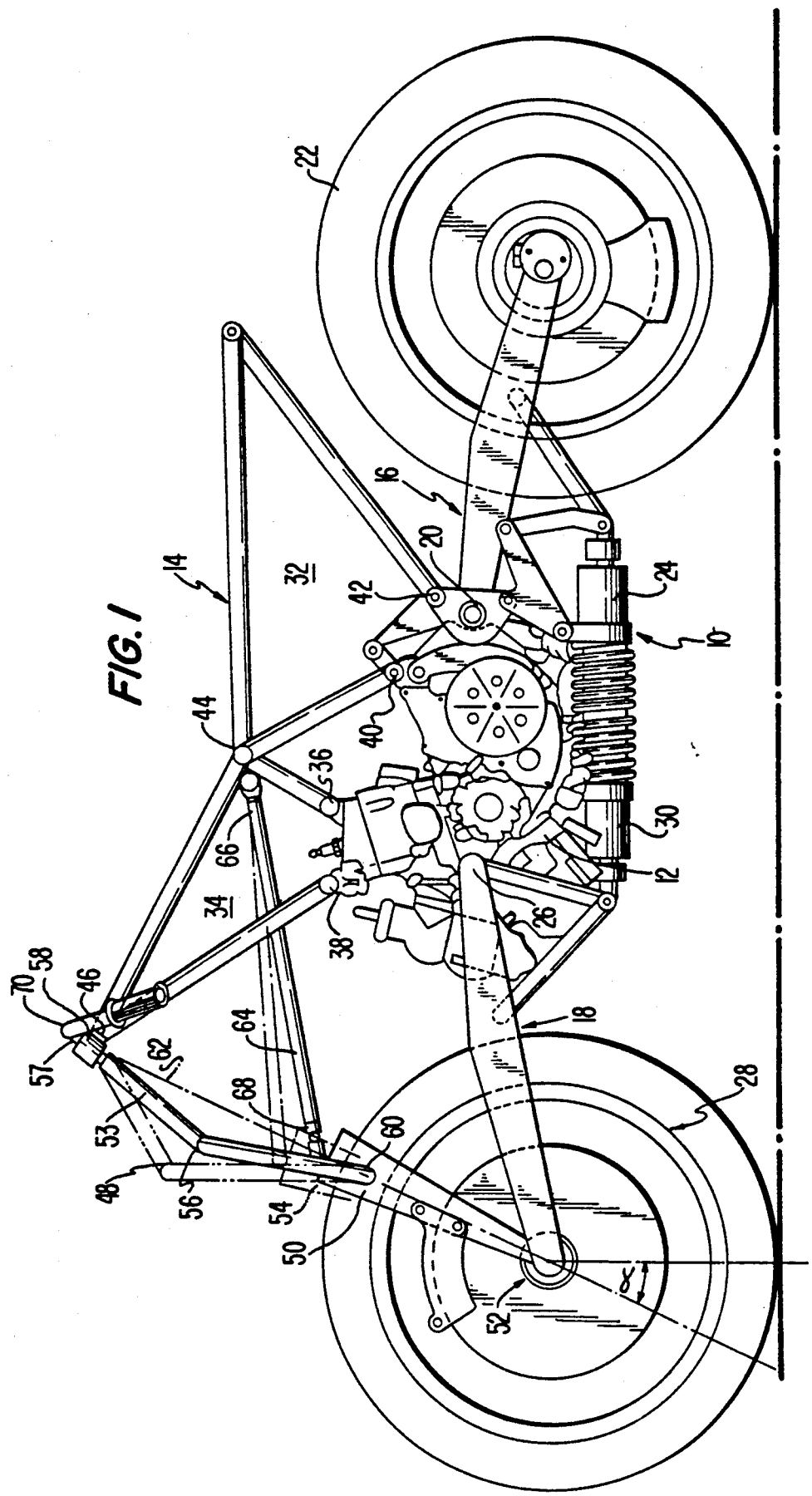
FIG. 1 is a side elevational view of a motorcycle according to the invention.

In FIG. 1 there is represented a vehicle 10 of the motorcycle type having two wheels and a motor 12 to which a rigid frame or framework 14 is connected forming a motor-framework unit, and two double pivotal arms, namely a rear arm 16 and a front arm 18. The rear pivotal arm pivots about a pin 20 mounted on the motor while its free end receives a rear wheel 22, a damping device 24 being disposed between the pivotal arm 16 and the motor 12.

The pivotal arm 18 is connected to the motor 12 by a pivot pin 26 about which it is pivotable while its free end receives a front wheel 28. A damping device 30 is disposed between the pivotal arm 18 and the motor 12.

The rigid frame 14 comprises two (rear and front, respectively) trapezium structures 32 and 34 whose sides are constituted by tubes connected at their ends to form the apices of the trapeziums. Two second and third apices 36 and 38 of the trapezium structure 34 and two apices 40, 42 of the trapezium structure 32 are directly connected to the motor. Further, these two trapezium structures 32 and 34 have a common first apex 44 substantially contained in the vertical median plane of the motor and perpendicular to the direction of travel. A free (fourth) apex 46 of the trapezium structure 34 receives a steering mechanism 48. This steering mechanism 48 comprises a fork 50 connected to a hub 52 of the front wheel and two steering linkages or compass structures 53 and 54 pivoted together by one of their ends on a common pin 56. The steering linkages 53 and 54 are generally referred to herein as compass structures due to their compass-like shape (note FIG. 7). Further, the upper compass structure 53 is connected by its other end to a pin or shaft 57 of a steering column 58. As concerns the other end of the compass structure 54, it is pivotally mounted relative to the fork 50 on a pin 60. The axis of rotation of the steering column 48 is symbolically represented by a dot/dash line 62.

A strut 64 controls the displacement of the fork 50 relative to the fixed frame 14. It is pivoted to the fork 50 and to the frame 14, more particularly in the region of the apex 44 common to the two trapezium structures 32 and 34. This strut 64 is adjustable in length by means of two inserts 66 and 68 placed at the ends and screw threaded with oppositely directed threads so that the rotation of the tube constituting the strut 64 causes the lengthening or the shortening of this strut.

The quadrilateral structure constituted by the fork 50, the strut 64 and the pivotal arm 18 and the motor unit is deformable.

It can be seen that the rigid frame 14 undergoes no displacement relative to the motor. The fork 50 moves in translation in a direction parallel to the axis 62 and the compass structures 53 and 54 make a variable angle there between depending on the position of the hub 52 relative to the steering column 58. The up and down movement is limited by the damping device 30 which limits the displacement of the pivotal arm 18.

The frame is completed by a steering control device, in this instance a handlebar 70, which is fixed to the pin 57 of the steering column 58.

The frame and the steering column according to the invention have the advantage of allowing an adjustment of the initial castor angle by modification of the length of the strut 64. Thus, depending on the size of the obstacles to be passed over or the state of the surface over which the vehicle travels, it is of utility to modify this angle instead of keeping a fixed angle determined by a mean value of the size of the obstacles. On uneven surfaces this angle is increased whereas on a smooth surface it is decreased so that the reaction of the obstacle on the wheel is located substantially on the axis of the fork 50.

Figure 2:
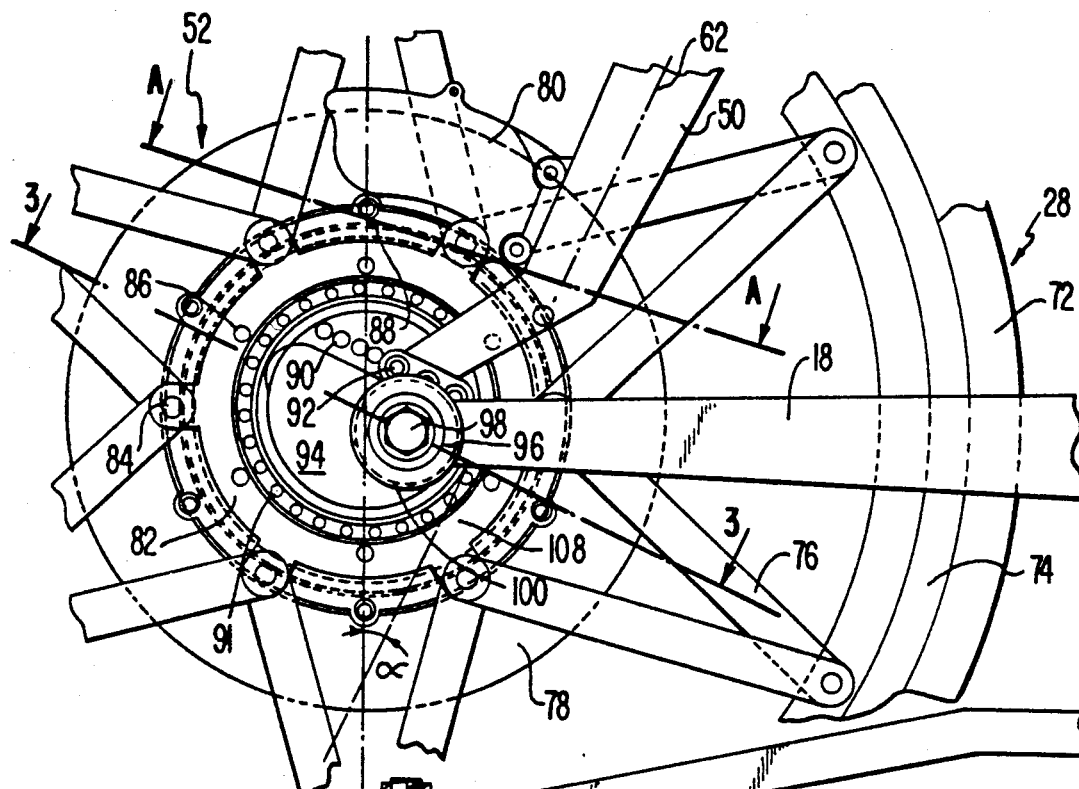
FIG. 2 is a detailed side elevational view of a mechanism for adjusting the castor and the castor angle according to the invention.

FIG. 2 shows in more detail the hub 52 and the connection of this hub to the steering column and more particularly to the fork 50 of the latter. The reference 28 concerns the front wheel and it is completed by a reference 72 concerning a tire, 74 concerning a rim and 76 concerning the "rod" spokes. A disc of a disc brake has reference 78 while its caliper carries the reference 80. The spokes 76 are fixed to an outer hub 82 by bolts 84 while the disc of the disc brake is fixed on this same outer hub 82 by bolts 86. The outer hub 82 may rotate about a fixed inner hub 88 through lateral ball bearings 91. The inner hub also has a series of bores 90 in which lower ends 92 of the fork 50 are fixed.

In this same Figure, the axis of rotation of the wheel and the two concentric hubs is indicated at C. Further, this inner hub 88 has an opening 94. An end 95 of the pivotal arms 18 carries a pivot pin 98 which is oriented parallel to the axis of rotation of the wheel. The pivot pin 98 is rotatable about its own axis by rolling bearings 100.

When the pivotal arm 18 is rotated, the rolling bearings 100 permit the modification of the angle made between the fork 50 and this pivotal arm. These rolling bearings 100 complete the fourth deformable point of the deformable quadrilateral structure.

Figure 3:
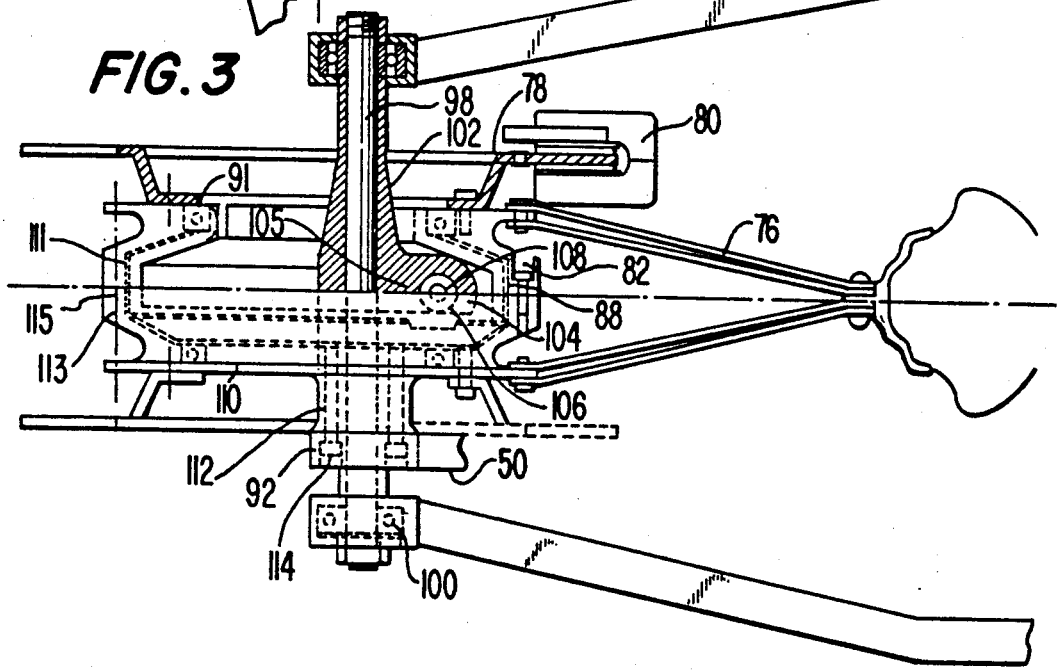
FIG. 3 represents in its upper part a sectional view of FIG. 2 taken on line 3—3 and, in the lower part of this same Figure, a plan view on line A—A of FIG. 2.

With reference to the upper part of FIG. 3, a pivot 102 is shown disposed coaxially on the pin 98. This pivot has an eccentric part 104 bored at 106. Introduced in this bore is a steering pin 108 at the ends of which is fixed the inner hub 88 along a straight line parallel to one of its diameters. The fixed hub includes a plurality of coaxial throughway bores 105 arranged in confronting relation along straight lines parallel to the same diameter so that the pivot pin 108 may be moved toward the center of rotation of the wheel C.

This permits varying the castor, that is, the distance on the ground between the point of intersection of the straight line coincident with the steering axis and the point of contact of the tire with the ground.

Thus it can be seen that the castor angle may be modified independently of the castor, and that these two parameters may be modified simultaneously so that the castor angle varies while maintaining a constant castor.

It is also possible to shift simultaneously the lower end 92 of the fork 50 in the bores 90 for correcting the castor angle.

There has been indicated in the lower part of FIG. 3 at 92 the lower end of the fork 50, and it can be seen that, considering the braking device, it is necessary to dispose between a side 110 of the fixed hub 88 and the end 92 a spacer member 112, the assembly being fixed by screws such as 114 on the same side 110 of the fixed hub 88.

For the purpose of facilitating the mounting of the outer hub 82 on the ball bearings 91, the hub has annular cheeks or side plates 111 and 113.

FIG. 4 shows a vehicle having two driving wheels and more particularly a transmission to the front steering wheel. The suspension of this wheel is constituted by a pivotal arm 124 connecting the hub 170 of the wheel to the motor unit 12, this pivotal arm being damped in its movements through a suitable linkage 128 by a damping device 126 located between this motor and the pivotal arm. The steering mechanism is constituted by a fork 118 which is connected to the hub, has a given castor angle and is connected to a upper part of the frame 120 by an assembly of two articulated compass structures 130 and 132. A driving shaft 136 of a driving motor 122 is connected to a relay box 138 through a transmission 134. The various articulations 136 and 140 of this transmission 134 are of the universal joint type, and may be provided with an intermediate connection 142 which also employs a universal joint so as to pass around the motor unit, this connection 142 being rotatively guided on the motor unit and interconnecting two shafts 141 and 143.

The relay box 138 is shown in more detail in FIG. 5 in which are shown triangular structures of the steering fork 118 located on each side of the front steering wheel.

A housing 144 receives two bearings 146 and 148 which are perpendicular to each other for supporting shafts 150 and 152 of two bevel gears 154, 156.

The shaft 150 of the gear 154 is driven through the universal joint articulation 140 of the transmission 134. The housing 144 is fixed relative to the frame and movable relative to the steering fork 118 owing to the provision of rolling bearings 157 disposed in the upper and lower parts of the housing.

The shaft 152 drives a universal joint articulation 158 which is itself connected to a shaft 160 of a sprocket pinion 162. The shaft 160 rotates in a bearing 164 carried by the triangular structures of the steering fork 118. The sprocket pinion 162 drives a chain 166 which itself cooperates with a sprocket wheel 168 connected to movable outer hub 170 of the front steering wheel.

An advantage of this type of transmission is to permit the use of a shaft 143 which is adjustable in length by means of a screw thread 145. Thus the shaft 143 performs the function of a transmission and a strut for varying the castor angle in a manner identical to the strut 64.

Figure 6:
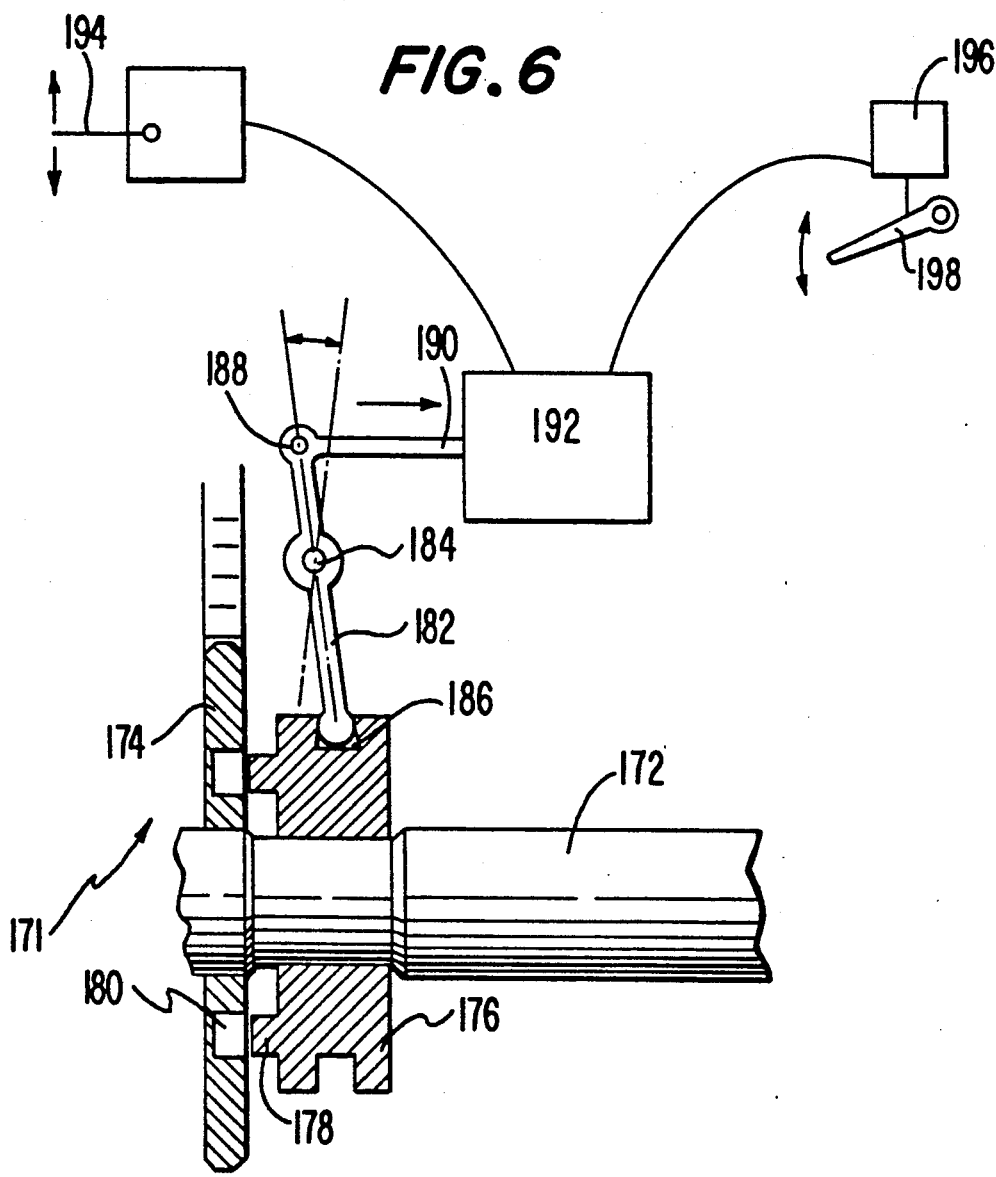
FIG. 6 is a diagrammatic view of a device for declutching the drive of the steering wheel according to the invention.

Shown in FIG. 6 is a declutching device 177 for the drive of a driving wheel and more particularly the declutching of a front steering wheel of a vehicle having two driving wheels.

A hub is diagrammatically shown at 172 by a shaft on which is freely mounted a toothed ring 174 while a pinion 176 connected to the shaft 172 is provided with driving studs 178 adapted to cooperate with bores 180 provided in the toothed ring 174. A lever 182 pivotable about a pin 184 is engaged with the pinion 176, its end cooperating with a groove 186. The other end 188 of lever 182 is pivoted to the shifting rod 190 of an actuator 192 so that the studs 178 of the pinion 176 can assume two positions: for driving and declutching.

This actuator 192 is controlled by two devices, one being constituted by a manual control 194 located for example on the handlebar and another control device 196 controlled by the movements of the rear brake pedal 198.

This device therefore operates in the following manner:

When the user desires to declutch the drive of the front wheel, he actuates the manual control 194 which itself controls the actuator whose rod 190 travels outwardly and urges the end 188 of the lever 182 and thus causes the relative displacement of the pinion 176 and the withdrawal of the studs 178 from the bores 180 of the ring 174.

On the other hand, in the neutral position, the actuator causes the rod 190 to effect a return movement and this has the effect of shifting the freely movable pinion 176 toward the ring 174 and introduce the studs 178 in the bores 180 as soon as the latter are in coincidence during the rotation of the ring relative to the pinion.

The simultaneous control by means of the rear pedal permits the declutching of the drive of the front wheel as soon as the rear wheel is braked, which avoids simultaneous locking of the front wheel in the event of a locking of the rear wheel.

In FIG. 7 there is shown an embodiment of the steering assembly of FIG. 1 viewed from in front so as to show the connections of the compass structures 52 and 54 to the frame, to each other, to steering fork and to the strut. It is thus possible to dispose universal joints 59, 61 for achieving the connections of the compass structures to the shaft 57 of the steering column and to the fork 50. The steering orientation of the wheel remains easy in all the positions of the pivotal arm relative to the frame.

The present invention has been described in its embodiments as applied to motorcycles, but, in the same way, the characteristics of the invention are applicable to sidecars or vehicles having three wheels and also to minicars.

What is claimed is:

1. A vehicle comprising:
at least two wheels, said at least two wheels including a front steering wheel and a rear wheel;
a motor-framework unit, said motor-framework unit comprising a driving motor and a framework connected to said driving motor;
means for connecting said wheels to said motor-framework unit;
means for damping movement of said wheels relative to said motor-framework unit;
a steering assembly connected to said front steering wheel;
steering control means connected to said steering assembly;
transmission means for transmitting a driving force between said driving motor and at least one of said at least two wheels; and
a strut articulated at one end thereof to said motor-framework unit and articulated at the other end thereof to said steering assembly.

2. The vehicle as set forth in claim 1, wherein:
said framework comprises a rigid frame fixed to an upper portion of said motor;
said means for connecting comprises two pivotal double arms articulated relative to said motor and mounting respective said front and rear wheels; and
said means for damping is disposed between said two double pivotal arms and said motor-framework unit.

3. The vehicle as set forth in claim 1, wherein:
said rigid frame comprises a plurality of tubes defining, together with said driving motor, a front trapezium structure and a rear trapezium structure, said trapezium structures having a common first apex;
second and third apexes of each said trapezium structure are fixed to said motor; and
a fourth apex of said front trapezium structure is connected to said steering assembly.

4. The vehicle is set forth in claim 3, wherein:
said steering assembly comprises a steering column, said steering column being connected to said fourth apex of said front trapezium structure, and said steering control means being connected to said steering column.

5. The vehicle as set forth in claim 1, wherein:
said steering assembly comprises a fork, said fork having side portions disposed on respective sides of said front wheel;
said front wheel has a hub, said side portions of said fork being fixed to said hub so as to define a predetermined castor angle; and
said steering assembly further comprises two compass structures, a pin connection articulating said compass structures together and a steering column having a shaft connected to a free end of one of said compass structures, a free end of the other of said compass structures being connected to said fork.

6. The vehicle as set forth in claim 5, wherein:
said shaft of said steering column is connected to said free end of said one of said compass structures with a universal joint; and
said free end of said other of said compass structure is connected to said fork with a universal joint.

7. The vehicle as set forth in claim 5, wherein:
said means for connecting said wheels to said motor-framework unit comprises a pivotal arm articulated relative to said motor and mounting said front wheel; and p1 said strut and said pivotal arm mounting said front wheel define, together with said fork and said motor-framework unit, a deformable quadrilateral structure.

8. The vehicle as set forth in claim 7, wherein:
said strut has means for adjusting the length of said strut in order to be able to adjust the castor angle.

9. The vehicle as set forth in claim 1, wherein:
said front wheel comprises a hub, said hub having an inner hub, said inner hub having side portions thereof connected to said steering assembly;
said inner hub has a steering shaft about which said inner hub is movable, said steering shaft being parallel to a given diameter of said inner hub;
said inner hub has a horizontal through hole therein;
a horizontal pivot pin is rotatively mounted relative to said means for connecting said wheel to said motor-framework unit, said pivot pin extending substantially perpendicular to the longitudinal direction of said motor-framework unit through said through hole of said inner hub;

a pivot on said pivot pin off center with respect to said inner hub, said steering shaft being carried by said pivot.

10. The vehicle as set forth in claim 9, wherein:
said inner hub has at least two bores therein parallel to said given diameter for receiving said steering shaft therein in varying positions relative to the axis of rotation of said front wheel in order to be able to adjust the castor.

11. The vehicle as set forth in claim 9, wherein:
said horizontal pivot pin is rotatively mounted relative to said means for connecting with rolling bearings.

12. The vehicle as set forth in claim 9, wherein:
said side portions of said inner hub comprises a plurality of bores for connecting said steering assembly thereto; and
said steering assembly comprises a steering column for connecting said steering control means to said steering assembly, said steering column being substantially parallel to said steering shaft of said inner hub.

13. The vehicle as set forth in claim 9, and further comprising an outer hub on said front wheel and two annular ball bearings between said outer hub and said inner hub, said annular ball bearings comprising inner cages carried by said inner hub and outer cages carrying said outer hub.

14. The vehicle as set forth in claim 13, wherein said outer hub comprises two annular side plates symmetrical relative to a plane parallel with said passing through said steering shaft, and symmetrical relative to the axis of rotation of said front wheel, said side plates having interconnecting screw connections therebetween.

15. The vehicle as set forth in claim 1, wherein:
said transmission means drivably connects said driving motor to said front steering wheel.

16. The vehicle as set forth in claim 15, wherein:
said transmission means comprises a universal joint connected to said driving motor, a driving shaft having one end thereof connected to said universal joint, a second universal joint connected to the other end of said driving shaft, and a transmission relay box connected to said second universal joint for driving said front steering wheel.

17. The vehicle as set forth in claim 16, wherein:
said relay box is mounted on said steering assembly.

18. The vehicle as set forth in claim 17, wherein:
said relay box comprises a housing having two bearings therein, two shafts mounted in said bearings, and two bevel gears mounted on respective said shafts, said gears being meshed with each other and one said shaft being connected to said second universal joint, such that one said gear is a driving gear and the other said gear is a driven gear; and
said housing has ball bearings mounting said housing on said steering assembly.

19. The vehicle as set forth in claim 18, wherein:
said shaft of said driven gear has a universal joint articulation connected thereto;
a sprocket shaft is connected to said universal joint articulation;
a driving sprocket pinion is connected to said sprocket shaft, said pinion having a chain for cooperation therewith; and
said front steering wheel has a movable outer hub thereon, said outer hub having a sprocket ring connected thereto to be driven by said chain.

20. The vehicle as set forth in claim 19, wherein:
said sprocket shaft has a sprocket shaft bearing rotatably mounting said sprocket shaft to said steering assembly.

21. The vehicle as set forth in claim 15, wherein:
said at least one wheel comprises an outer hub thereon;
said transmission means transmits driving force from said driving motor to said outer hub; and
said transmission means comprises a declutching means for engaging and disengaging said driving force from said at least one wheel at said outer hub.

22. The vehicle as set forth in claim 21, wherein:
said transmission means further comprises a sprocket ring movably mounted with respect to said outer hub; and
said declutching means of said transmission means comprises a pinion cooperating with said outer hub and movable between a position for driving engagement with said sprocket ring and a disengaged position.

23. The vehicle as set forth in claim 22, wherein:
said declutching means further comprises a lever for shifting said pinion between said positions, an actuator for controlling said lever, and means for controlling said actuator by at least one of manual control and a rear brake pedal control.

24. The vehicle as set forth in claim 1, wherein:
said transmission means includes said strut articulated at one end thereof to said motor-framework unit and at the other end thereof to said steering assembly.

25. The vehicle as set forth in claim 24, wherein:
said strut has means for adjusting its length in order to adjust the castor angle of said at least one wheel.

26. The vehicle as set forth in claim 24, wherein:
said transmission means drivably connects said driving motor to said front steering wheel;
said transmission means comprises a universal joint connected to said driving motor, a driving shaft having one end thereof connected to said universal joint, a second universal joint connected to the other end of said driving shaft, and a transmission relay box connected to said second universal joint for driving said front steering wheel;
wherein said strut is a portion of said driving shaft, said strut being connected to said second universal joint.

* * * * *